United States Patent
Goto

(10) Patent No.: US 8,107,926 B2
(45) Date of Patent: Jan. 31, 2012

(54) COMMUNICATION DEVICE

(75) Inventor: Shinya Goto, Nagoya (JP)

(73) Assignee: Brother Kogyo Kabushiki Kaisha, Nagoya-si, Aichi-ken (JP)

( * ) Notice: Subject to any disclaimer, the term of this patent is extended or adjusted under 35 U.S.C. 154(b) by 433 days.

(21) Appl. No.: 12/407,773

(22) Filed: Mar. 19, 2009

(65) Prior Publication Data

US 2009/0247127 A1 Oct. 1, 2009

(30) Foreign Application Priority Data

Mar. 28, 2008 (JP) ................................. 2008-085536

(51) Int. Cl.
*H04M 1/66* (2006.01)

(52) U.S. Cl. ..................... 455/411; 455/410; 455/550.1

(58) Field of Classification Search .................. 455/411, 455/550.1, 426.1, 428, 462, 507, 410, 418, 455/414.1; 379/428.02
See application file for complete search history.

(56) References Cited

U.S. PATENT DOCUMENTS

| 5,956,392 | A | 9/1999 | Tanigawa et al. | |
|---|---|---|---|---|
| 6,741,852 | B1 * | 5/2004 | Mohrs | 455/411 |
| 2003/0216146 | A1 * | 11/2003 | Otsuka | 455/462 |
| 2004/0240430 | A1 * | 12/2004 | Lin et al. | 370/352 |
| 2006/0148417 | A1 * | 7/2006 | Luers | 455/73 |
| 2007/0149170 | A1 * | 6/2007 | Bloebaum et al. | 455/411 |
| 2008/0167068 | A1 * | 7/2008 | Mosleh et al. | 455/553.1 |

FOREIGN PATENT DOCUMENTS

| JP | H06-209368 A | 7/1994 |
|---|---|---|
| JP | H09-135293 A | 5/1997 |
| JP | 2004-350063 A | 12/2004 |
| JP | 2005-143047 A | 6/2005 |

* cited by examiner

*Primary Examiner* — Cong Tran
(74) *Attorney, Agent, or Firm* — Baker Botts L.L.P.

(57) ABSTRACT

A communication device includes a base unit and a handset. The base unit includes a first communication unit, an authentication data storing unit, and an authentication data transmitting unit. The first communication unit is configured to communicate with an external device by using a communication service subject to setting authentication data into the communication service. The authentication data storing unit stores the authentication data. The authentication data transmitting unit transmits the authentication data to the handset. The handset include a second communication unit, an authentication data receiving unit, and a setting unit. The second communication unit is configured to communicate with the external device by using the communication service subject to setting authentication data into the communication service. The authentication data receiving unit receives the authentication data transmitted from the authentication data transmitting unit. The setting unit sets the authentication data received by the authentication data receiving unit into the communication service when the second communication unit attempts to communicate with the external device by using the communication service.

13 Claims, 10 Drawing Sheets

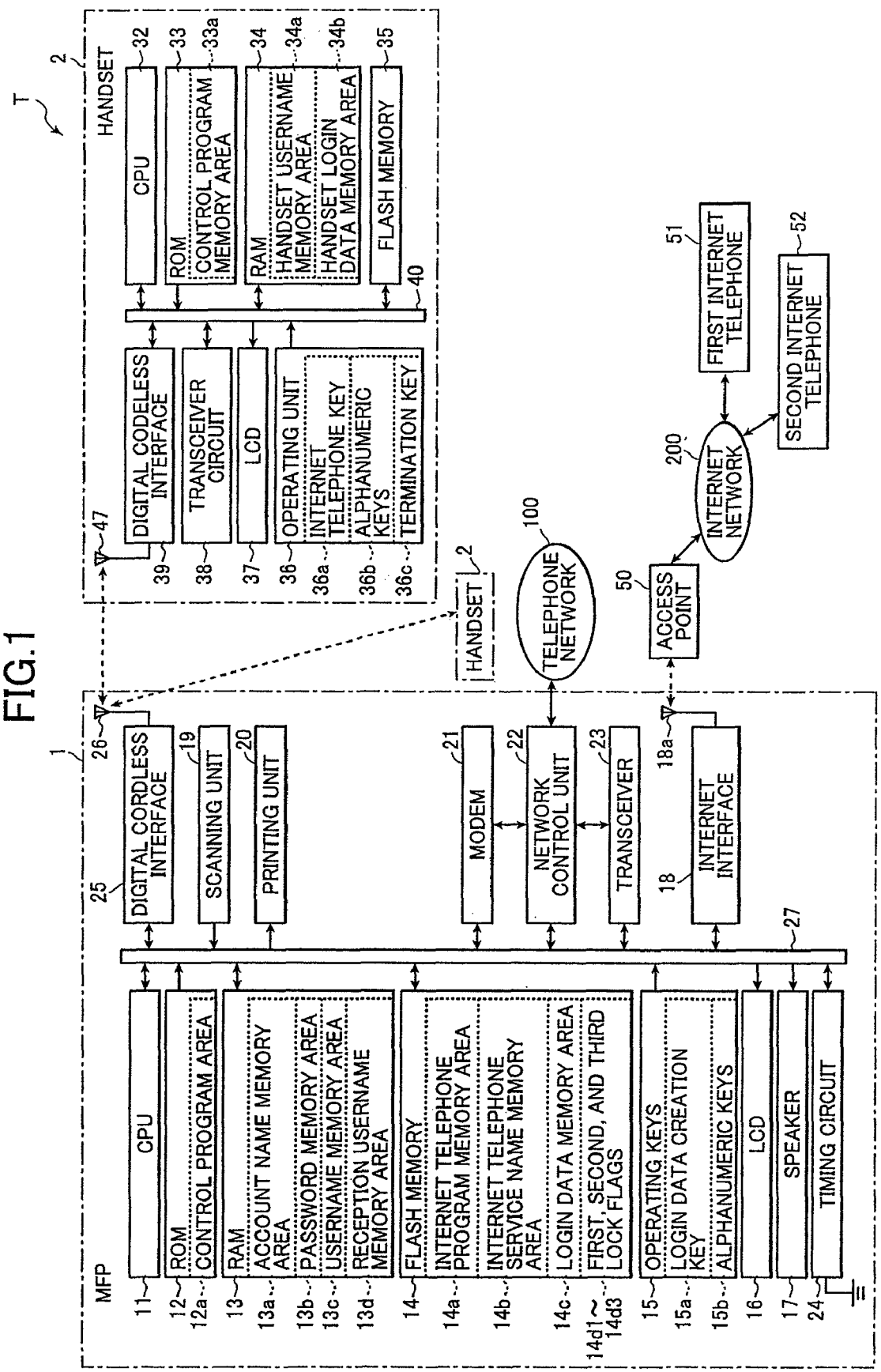

| USERNAME | LOCK PASSWORD | INTERNET TELEPHONE SERVICE NAME | ACCOUNT NAME | PASSWORD |
|---|---|---|---|---|
| ABC | 3523 | FIRST INTERNET TELEPHONE SERVICE | abc | 1234 |
| ABC | 3523 | SECOND INTERNET TELEPHONE SERVICE | ef3 | abcd |
| XYZ | 4289 | FIRST INTERNET TELEPHONE SERVICE | uf4 | 5678 |
| RST | Null | SECOND INTERNET TELEPHONE SERVICE | asw | aaca |

| INTERNET TELEPHONE SERVICE NAME | ACCOUNT NAME | PASSWORD |
|---|---|---|
| FIRST INTERNET TELEPHONE SERVICE | abc | 1234 |
| SECOND INTERNET TELEPHONE SERVICE | ef3 | abcd |

34b1　34b2　34b3

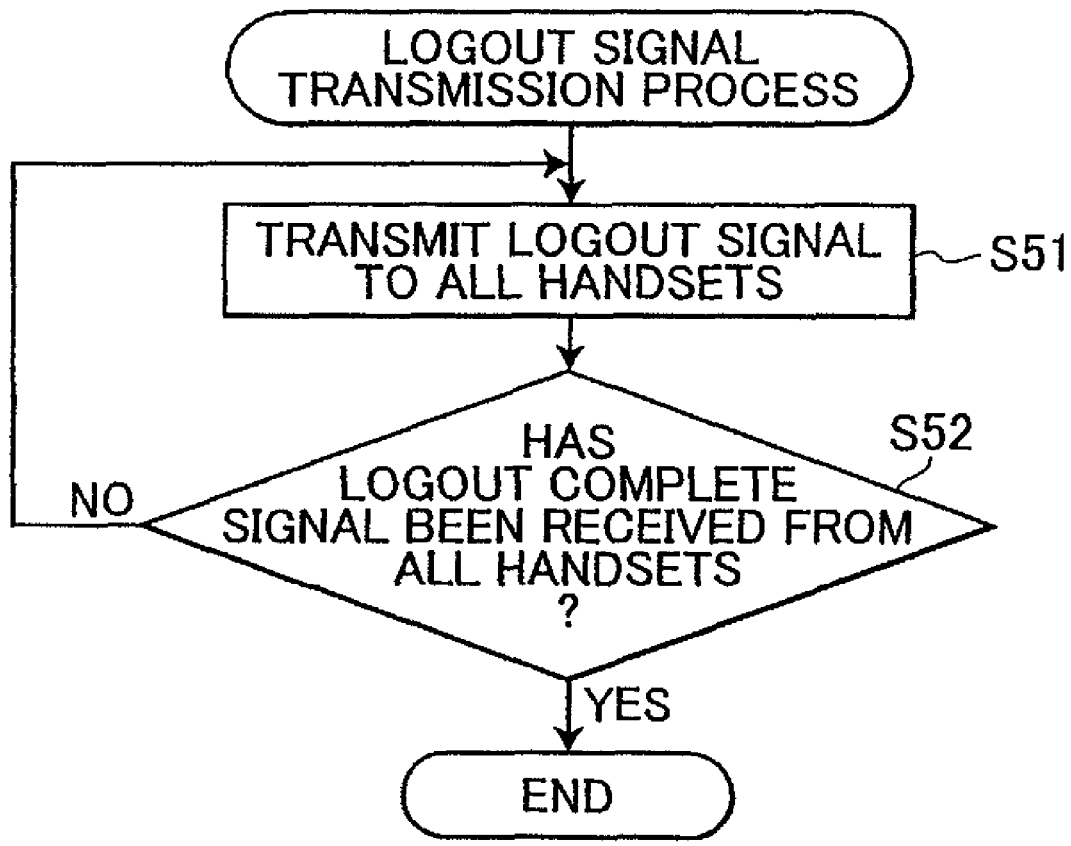

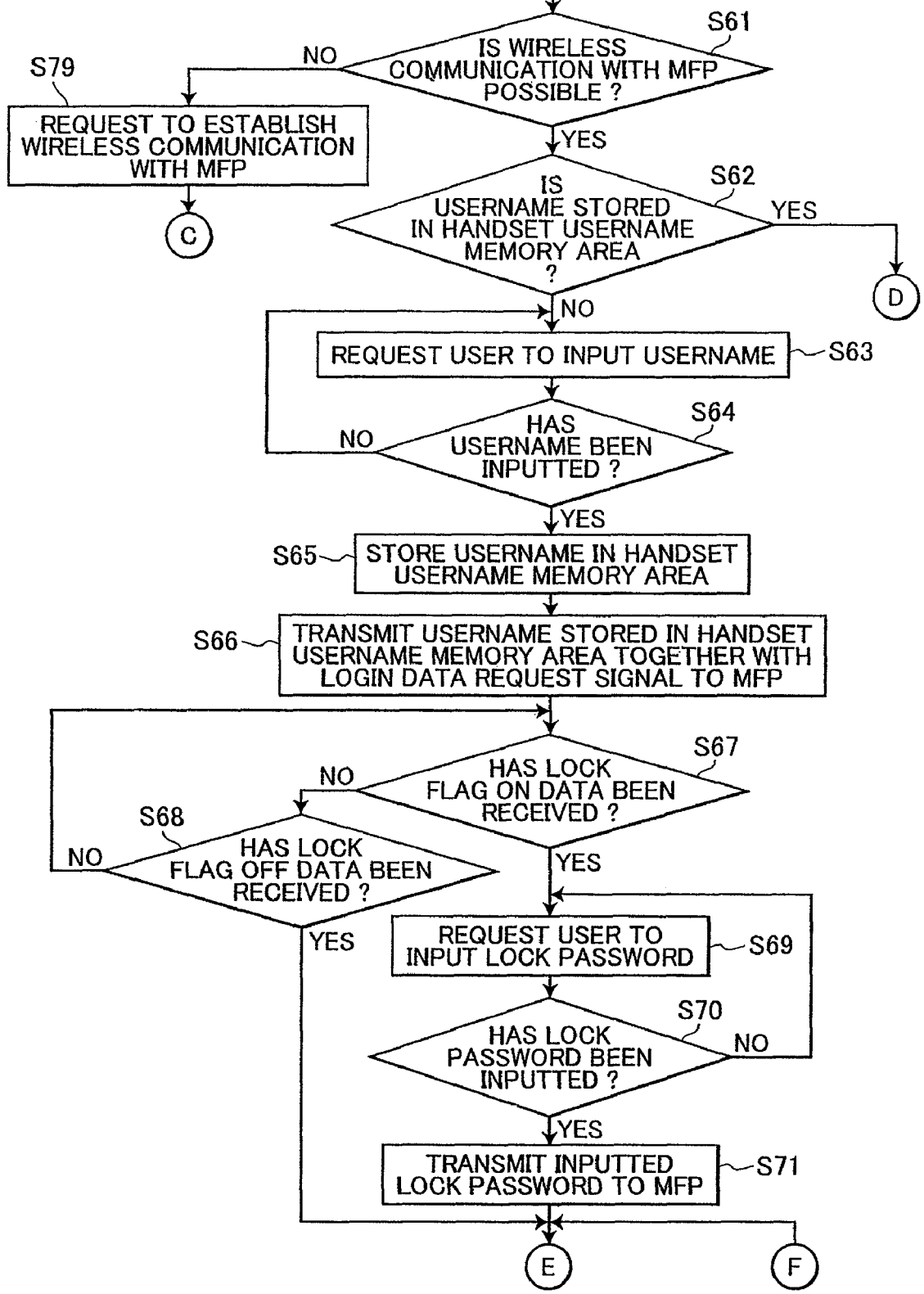

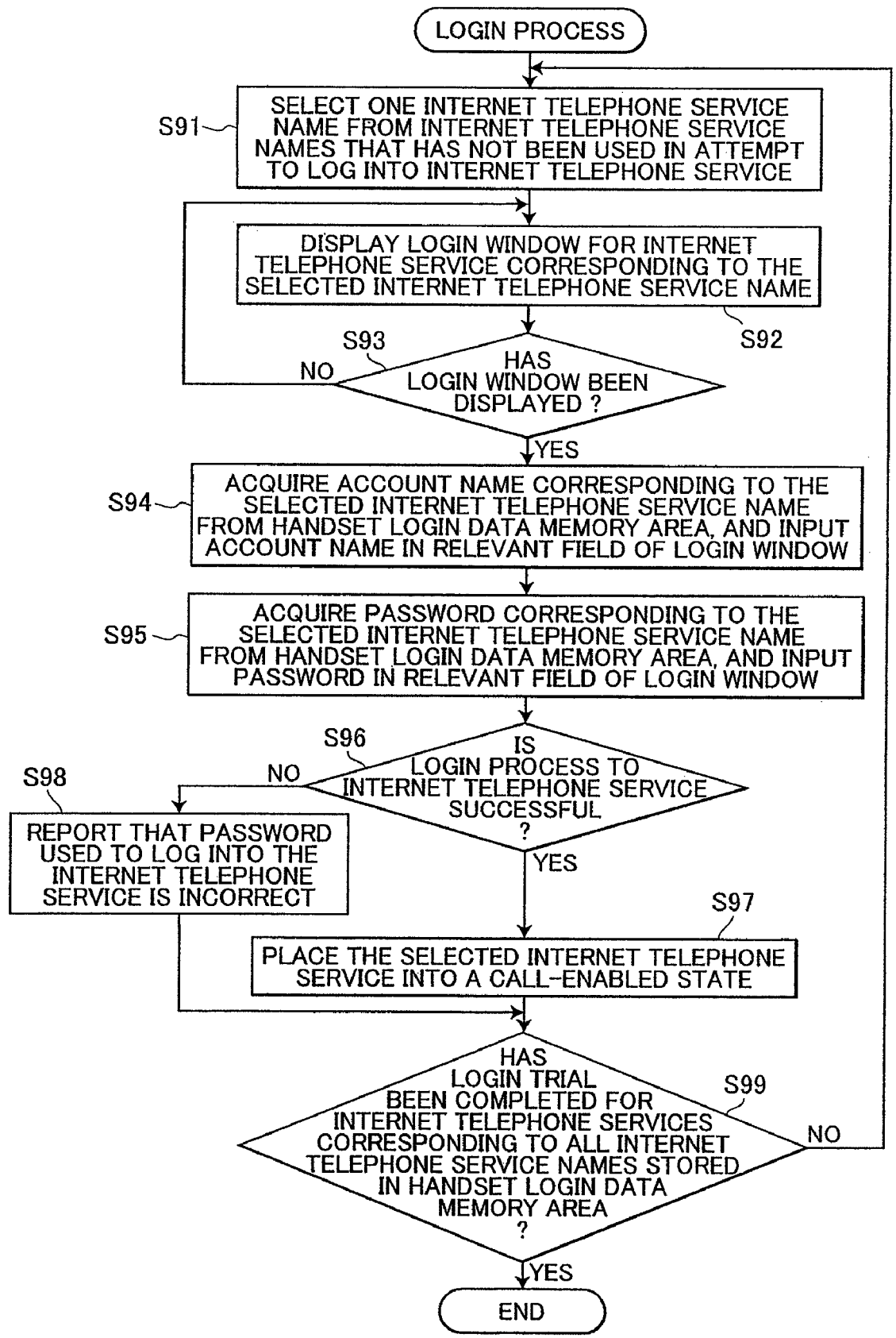

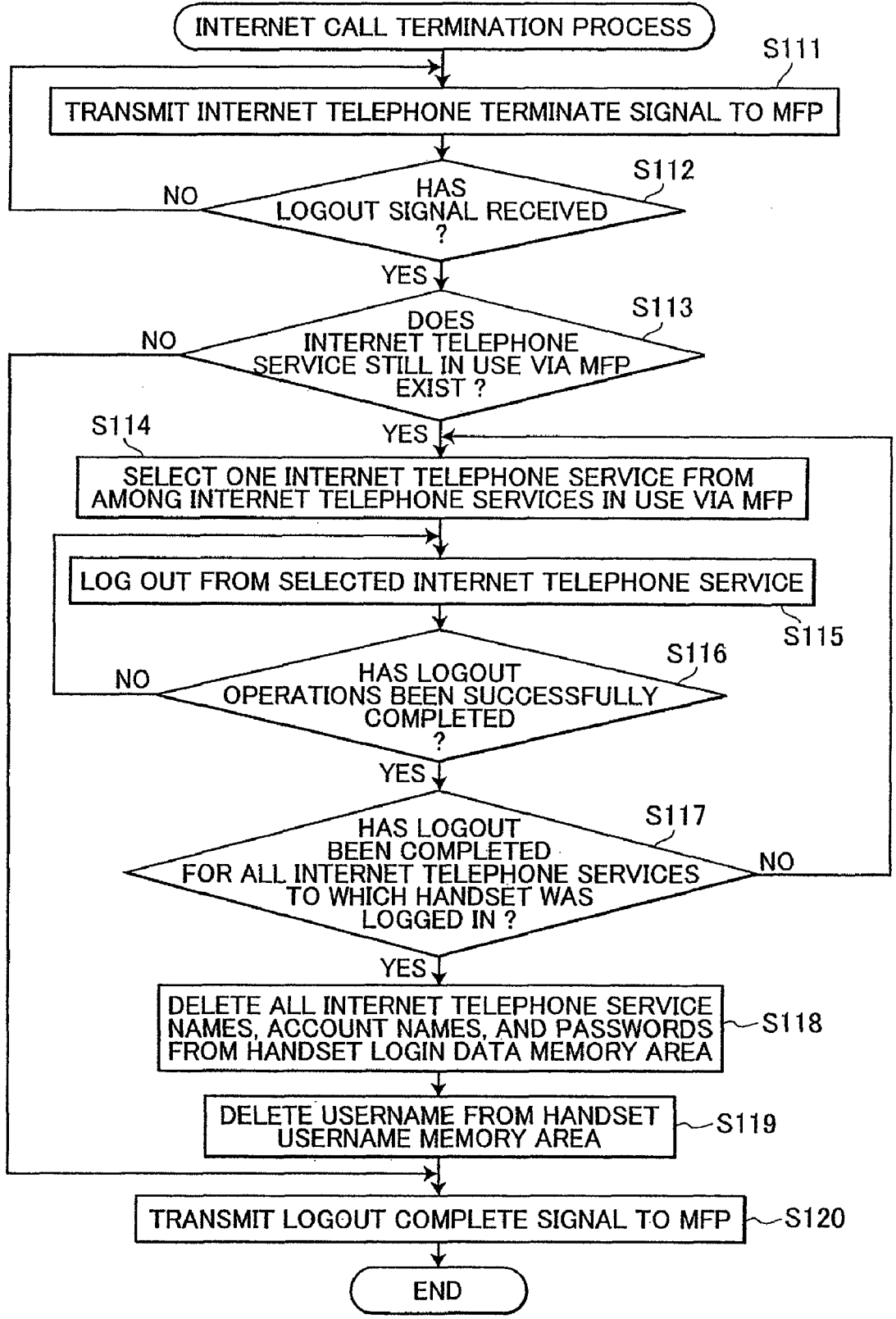

COMMUNICATION DEVICE

CROSS REFERENCE TO RELATED APPLICATION

This application claims priority from Japanese Patent Application No. 2008-085536 filed Mar. 28, 2008. The entire content of this priority application is incorporated herein by reference.

TECHNICAL FIELD

The present invention relates to a communication device including a base unit and a handset.

BACKGROUND

An Internet telephone for conducting voice communications with an external device on the Internet is well known in the art. The Internet telephone is implemented by installing an Internet telephone program supplied from an Internet telephone service provider on a communication device capable of connecting to the Internet. Internet telephone programs known in the art include Skype (registered trademark) provided by Skype Technologies, and Google Talk provided by Google.

When a user uses the Internet telephone, the user must complete a login process, i.e., user authentication, for each Internet telephone. Here, by storing user authentication data required for login on a storage device, the communication device can use this stored authentication data to log into the Internet telephone. For example, Japanese unexamined patent application publication No. HEI-9-135293 discloses a telephone set 10 used in a telephone exchange system. In the telephone exchange system, the telephone set 10 stores user authentication data in an individual information storing memory 14 provided in an exchange. When logging into the Internet telephone, the telephone set 10 receives the user authentication data stored in the individual information storing memory 14 and uses this data for logging in. Accordingly, the user of the telephone set 10 does not need to input user authentication data when using the Internet telephone.

However, if the telephone set 10 described above is provided with a handset capable of communicating with the external device on the Internet via the telephone set, the handset cannot access the user authentication data stored in the individual information storing memory 14. Therefore, when performing an Internet telephone call using the handset, the user must manually input the user authentication data each time the user logs into the Internet telephone, resulting in troublesome operations.

SUMMARY

In view of the foregoing, it is an object of the invention to provide a communication device capable of communicating to an external device without manually inputting user authentication data when a user performs an Internet telephone call using the handset.

In order to attain the above and other objects, the invention provides a communication device including a base unit and a handset. The base unit includes a first communication unit, an authentication data storing unit, and an authentication data transmitting unit. The first communication unit is configured to communicate with an external device by using a communication service subject to setting authentication data into the communication service. The authentication data storing unit stores the authentication data. The authentication data transmitting unit transmits the authentication data to the handset. The handset includes a second communication unit, an authentication data receiving unit, and a setting unit. The second communication unit is configured to communicate with the external device by using the communication service subject to setting authentication data into the communication service. The authentication data receiving unit receives the authentication data transmitted from the authentication data transmitting unit. The setting unit sets the authentication data received by the authentication data receiving unit into the communication service when the second communication unit attempts to communicate with the external device by using the communication service.

According to another aspect, the present invention provides a base unit of a communication device. The communication device is configured to communicate with an external device and includes the base unit and a handset. The base unit includes a communication unit, an authentication data storing unit, and an authentication data transmitting unit. The communication unit is configured to a communication between the external device and the handset by using a communication service, subject to setting authentication data into the communication service. The authentication data storing unit stores the authentication data. The authentication data transmitting unit transmits the authentication data to the handset when a request for transmitting the authentication data is received from the handset.

According to another aspect, the present invention provides a handset of a communication device. The communication device includes the handset and a base unit. The communication device is configured to communicate with an external device by using a communication service subject to setting authentication data into the communication service. The base unit stores the authentication data. The handset includes a communication unit, an authentication data receiving unit, and a setting unit. The communication unit is configured to communicate with the external device by using the communication service subject to setting authentication data into the communication service. The authentication data receiving unit receives the authentication data from the base unit. The setting unit sets the authentication data received by the authentication data receiving unit into the communication service when the communication unit attempts to communicate with the external device by using the communication service.

According to another aspect, the present invention provides a communication method executed by a communication device including a base unit and a handset. The base unit stores authentication data. The handset is configured to communicate with an external device by using a communication service subject to setting authentication data into the communication service. The communication method comprises: transmitting the authentication data to the handset by the base unit; receiving the authentication data transmitted from the base unit by the handset; and setting the authentication data into the communication service by the handset when the handset attempts to communicate with the external device by using the communication service.

According to another aspect, the present invention provides a computer-readable recording medium that stores a communication program executed on a communication device. The communication device includes a base unit and a handset. The base unit stores authentication data. The handset is configured to communicate with an external device by using the communication service subject to setting authentication data into the communication service. The communication program comprising instructions for: transmitting the authentication data to the handset by the base unit; receiving the authentication data transmitted from the base unit by the handset; and setting the authentication data into the communication service by the handset when the handset attempts to communicate with the external device by using the communication service.

BRIEF DESCRIPTION OF THE DRAWINGS

The particular features and advantages of the invention as well as other objects will become apparent from the following description taken in connection with the accompanying drawings, in which:

FIG. 1 is a block diagram showing an electrical structure of a communication device according to an embodiment of the invention, the communication device including a base unit and a handset;

FIG. 2A is a conceptual diagram illustrating login data stored in the base unit;

FIG. 2B is a conceptual diagram illustrating handset login data stored in the handset;

FIG. 5 is a flowchart illustrating steps in a logout signal transmission process executed by the base unit;

FIGS. 6A and 6B are flowcharts illustrating steps in a login signal reception process executed by the handset;

FIG. 7 is a flowchart illustrating steps in a login process executed by the handset; and FIG. 8 is a flowchart illustrating steps in an Internet call termination process executed by the handset.

DETAILED DESCRIPTION

Figure 3A:
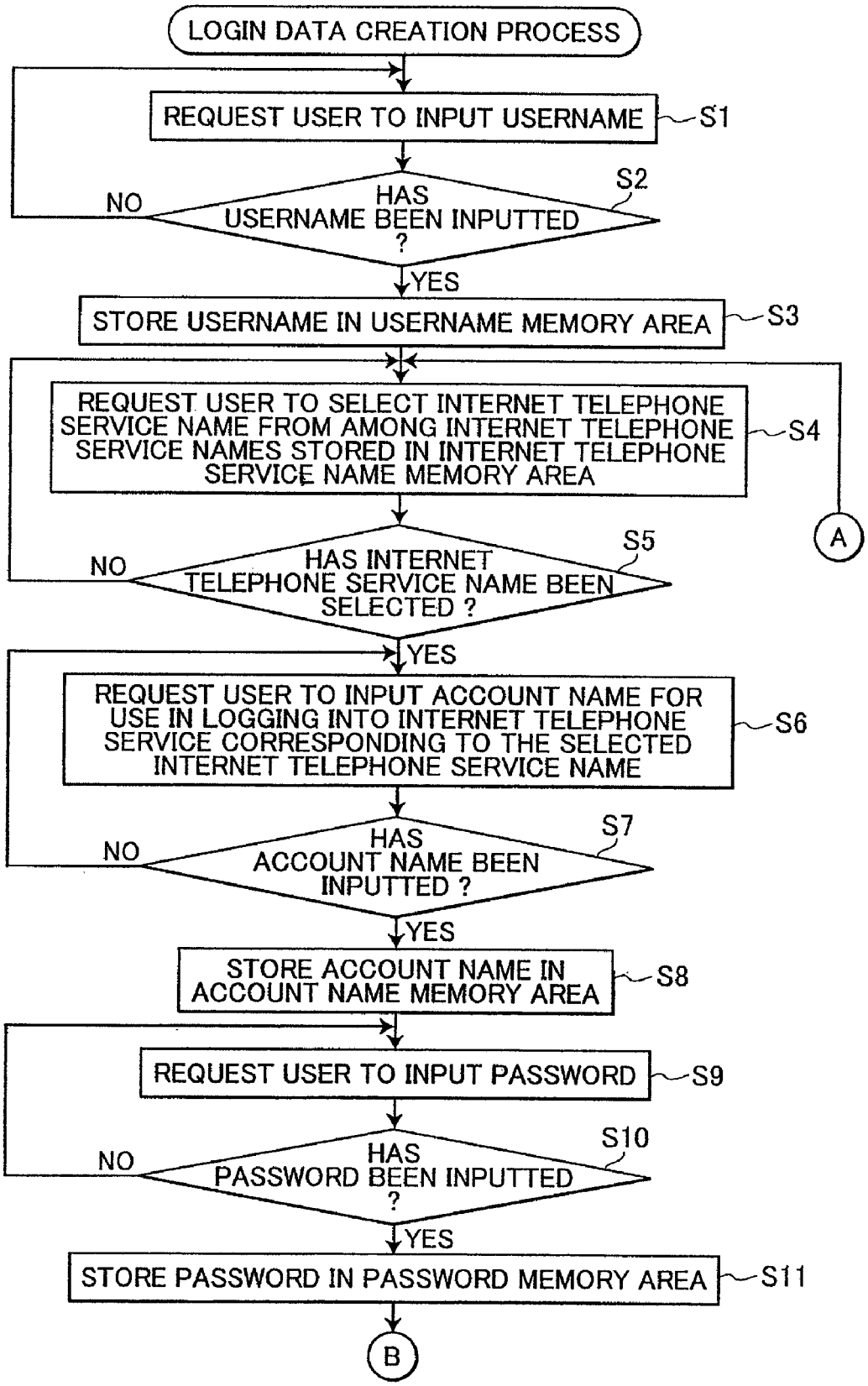
FIGS. 3A and 3B are flowcharts illustrating steps in a login data creation process executed by the base unit.

FIG. 1 is a block diagram showing the electrical structure of a communication device T according to the first embodiment in a communication system. In the communication system the communication device T is configured to communicates with first and second internet telephones 51 and 52 via an access point 50 and a Internet 200.

The communication device T includes a multifunction peripheral (hereinafter abbreviated as MFP) 1 and two handsets 2. When conducting an Internet telephone call using the handset 2, the communication device T can eliminate the need for the user to input account name and password as user authentication data on the handset 2 for use in an Internet telephone login (user authentication). In other words, the handset 2 sets the authentication data into an Internet telephone service when the second communication unit attempts to communicate with the external device by using the Internet telephone service. The Internet telephone service is a service for conducting voice communications with the first Internet telephone 51 and second Internet telephone 52 via the Internet 200. Internet telephone programs known in the art include Skype (registered trademark) provided by Skype Technologies, and Google Talk provided by Google.

The MFP 1 possesses various functions, such as a communication function, a facsimile function, a printer function, a scanner function, and a copier function. The MFP 1 also functions as a communication device capable of performing wireless data communications with access point 50, connecting to the Internet 200, and using the Internet telephone service via the Internet 200.

The MFP 1 serves as the base unit for a digital cordless telephone that connects to the Internet 200 and the handset 2. The handset 2 functions to perform wireless voice communications with the MFP 1 and to perform voice communications with the first and second Internet telephones 51 and 52 through the MFP 1, access point 50, Internet 200 and the communication service. Specifically, the handset 2 is configured to communicate with the first and second Internet telephones by using the communication service subject to inputting the account name and password into the communication service and logging into the communication service.

The MFP 1 includes primarily a CPU 11, a ROM 12, a RAM 13, a flash memory 14, a operating keys 15, a liquid crystal display (hereinafter referred to as "LCD") 16, a speaker 17, an Internet interface 18 including an Internet antenna 18a, a scanning unit 19, a printing unit 20, a modem 21, a network control unit 22, a transceiver 23, a timing circuit 24, and digital cordless interface 25 including a digital cordless antenna 26. These are connected each other via a bus line 27.

The CPU 11 is a processor that executes various programs stored in the ROM 12, the RAM 13, and the flash memory 14 and various signals transmits or received via the Internet interface 18, the Network control unit 22, and the digital cordless interface 25. The CPU 11 controls the overall operation of the MFP 1.

The ROM 12 includes a control program area 12a that stores various control programs executed by the CPU 11. The ROM 12 is a memory that stores a program of a main process and a program of a communication setting process described later.

The RAM 13 is a nonvolatile memory that temporarily stores various data and like required in various processes executed by the CPU 11. The RAM 13 includes a account name memory area 13a, a password memory area 13b, a login data memory area 13c, and a reception username memory area 13d.

In the embodiment, the user authentication data is configured of an account name (user ID) assigned to each user using an Internet telephone, and a password associated with the account name. Generally an account name and password are required when logging into an Internet telephone. Hence, the account name and password are used as user authentication data.

The account name memory area 13a stores the account name (user ID) as one part of user authentication data that is used when logging into an Internet telephone service. The account name memory area 13a temporarily stores an account name to be used for logging into an Internet telephone service when the user inputs an account name using alphanumeric keys 15b on the MFP 1. When the user inputs an account name, the CPU 11 copies and stores the account name subsequently into a login data memory area 14c described later, and deletes the account name from the account name memory area 13a.

The password memory area 13b stores the password as a part of the user authentication data required for logging into the Internet telephone service. The password memory area 13b temporarily stores the password for login when the user inputs the password using the alphanumeric keys 15b of the MFP 1. When the user inputs a password, the CPU 11 copies and stores the password stored in the password memory area 13b into the login data memory area 14c, and deletes the password from the password memory area 13b.

The username memory area 13c temporarily stores a username when the user inputs the username to indicate the user corresponding to both the account name temporarily stored in the account name memory area 13*a* and the password temporarily stored in the password memory area 13*b* by using the alphanumeric keys 15*b* of the MFP 1. When the user inputs the username, the CPU 11 copies and stores the username stored in the username memory area 13*c* into the login data memory area 14*c*, and deletes the username from the username memory area 13*c*.

The reception username memory area 13*d* temporarily stores a username that is transmitted from the handset 2 and indicates the person using the Internet telephone with the handset 2. The username stored in the reception username memory area 13*d* is used to select login data stored in the login data memory area 14*c* described later and to select one lock flag of first through third lock flags 14*d*1-14*d*3 described later. The CPU 11 deletes the username from the reception username memory area 13*d* after completing a login data transmission process described later with reference to FIG. 4.

The flash memory 14 is nonvolatile memory that can be written thereto and maintain the data when the power to the MFP 1 is cut off. The flash memory 14 includes an Internet telephone program memory area 14*a*, an Internet telephone name memory area 14*b*, the login data memory area 14*c*, and the first through third lock flags 14*d*1-14*d*3.

The Internet telephone program memory area 14*a* stores various Internet telephone programs. Since a unique Internet telephone program is required for each type of Internet telephone service, the Internet telephone program memory area 14*a* stores a plurality of Internet telephone programs corresponding to various Internet telephone services. In the embodiment, the Internet telephone program memory area 14*a* stores a first Internet telephone program capable of conducting voice communications with the first Internet telephone 51 by using a first Internet telephone service, and a second Internet telephone program capable of conducting voice communications with the second Internet telephone 52 by using a second Internet telephone service.

The Internet telephone name memory area 14*b* stores the names of Internet telephone services (hereinafter referred to as "Internet telephone service names") implemented according to the Internet telephone programs stored in the Internet telephone program memory area 14*a*. When the user that has set the account name and the like selects one Internet telephone service name from the Internet telephone service names stored in the Internet telephone service name memory area 14*b*, the CPU 11 subsequently associates the account name, password, and username set with the alphanumeric keys 15*b* for the selected Internet telephone service name. In the embodiment, the Internet telephone service name memory area 14*b* stores "First Internet Telephone Service" as the name corresponding to the first Internet telephone program and "Second Internet Telephone Service" as the name corresponding to the second Internet telephone program.

In addition to correlations of Internet telephone service names, account names, passwords, and usernames, the CPU 11 further associates these correlations with lock passwords required to release a locking function restricting use of the account name and password. The login data memory area 14*c* manages these correlations as the login data.

Here, the login data stored in the login data memory area 14*c* will be described with reference to FIG. 2A. FIG. 2A conceptually illustrates the login data stored in the login data memory area 14*c*. The login data memory area 14*c* is configured of records having various data fields, including the username 14*c*1, the lock password 14*c*2, the Internet telephone service name 14*c*3, the account name 14*c*4, and the password 14*c*5.

The username 14*c*1 is set to the username temporarily stored in the username memory area 13*c*. The lock password 14*c*2 is set by the user possessing the username stored in the username 14*c*1. The Internet telephone name 14*c*3 is set to one Internet telephone service name from among Internet telephone service names stored in the Internet telephone service name memory area 14*b* selected by the user associated with the account name. The account name 14*c*4 is set to the account name temporarily stored in the account name memory area 13*a*. The password 14*c*5 is set to the password temporarily stored in the password memory area 13*b*.

Specifically, the login data memory area 14*c* stores in correlation the username "ABC" as the username 14*c*1, the lock password "3523" as the lock password 14*c*2, the Internet telephone name "First Internet Telephone Service" as the Internet telephone service name 14*c*3, the account name "abc" as the account name 14*c*4, and the password "1234" as the password 14*c*5. In addition, the login data memory area 14*c* stores in correlation the username "ABC" as the username 14*c*1, the lock password "3523" as the lock password 14*c*2, the Internet telephone service name "Second Internet Telephone Service" as the Internet telephone service name 14*c*3, the account name "ef3" as the account name 14*c*4, and the password "abcd" as the password 14*c*5. Since the locking function for restricting use of the account name and password is set for each username using the Internet telephone service rather than each available Internet telephone service, the same lock password "3523" has been set for the user with username "ABC".

Similarly, the login data memory area 14*c* stores in correlation the username "XYZ" as the username 14*c*1, the lock password "4289" as the lock password 14*c*2, the Internet telephone service name "First Internet Telephone Service" as the Internet telephone name 14*c*3, the account name "uf4" as the account name 14*c*4, and the password "5678" as the password 14*c*5.

The login data memory area 14*c* also stores in correlation the username "RST" as the username 14*c*1, the lock password "Null" (not set) as the lock password 14*c*2, the Internet telephone name "Second Internet Telephone Service" as the Internet telephone service name 14*c*3, the account name "asw" as the account name 14*c*4, and the password "aaca" as the password 14*c*5. Since the locking function restricting usage of the account name and password has not been set for username "RST," the lock password stored as the lock password 14*c*2 is "Null," indicating a lock password has not been set.

In this way, the login data memory area 14*c* stores correlations of usernames, lock passwords, Internet telephone service names, account names, and passwords as the login data.

Returning to FIG. 1, the first lock flag 14*d*1, second lock flag 14*d*2, and third lock flag 14*d*3 are flags that are provided for usernames and indicate whether the locking function is set using an Internet telephone service. In the embodiment, since there are three users using an Internet telephone (see FIG. 2A), the flash memory 14 is provided with three lock flags 14*d*1-14*d*3.

When the user accessing the Internet telephone sets the locking function, the lock flag from among the first through third lock flags 14*d*1-14*d*3 corresponding to the username of this user is set to ON. In the example shown in FIG. 2A, the lock flag 14*d*1 is set to ON since the lock password "3523" is set for username "ABC". The lock flag 14*d*2 is set to ON when the lock password "4289" is set for the username "XYZ". The lock flag 14*d*3 is set to OFF since the lock password for the username "RST" is not set, in other words, since the lock password "Null" is set for the username "RST".

To use the Internet telephone with the handset 2, the user must input a lock password when the corresponding lock flag 14*d*1-14*d*3 is set to ON. If the inputted lock password does not match the corresponding lock password 14*c*2 stored in the login data memory area 14*c*, the MFP 1 fails to transmit the login data stored in the login data memory area 14*c* to the handset 2 when the handset 2 requests transmission of this login data. However, if the lock flag is set to OFF, the MFP 1 transmits the login data stored in the login data memory area 14*c* to the handset 2 when the handset 2 requests transmission of this data.

In order to turn off one of the first through third lock flags 14*d*1-14*d*3 currently set to ON, the user can cancel the ON state of the lock flag by operating the operating keys 15.

The operating keys 15 are buttons for enabling the user to input instruction. The MFP 1 performs various operations in accordance with the instruction inputted by the user. For example, the MFP 1 switches the functions in the MFP 1 among the scanning function, printing function, and facsimile function. The user can input instructions in the MFP 1 by manipulating the operating keys 15. The operating keys 15 include login data creation key 15*a* and alphanumeric keys 15*b*.

The login data creation key 15*a* is a button operated to create login data to be stored in the login data memory area 14*c*. When the user presses the login data creation key 15*a*, the CPU 11 begins a login data creation process described later with reference to FIGS. 3A and 3B, enabling the user to create login data that will be stored in the login data memory area 14*c*. The alphanumeric keys 15*b* are buttons operated when inputting login data to be stored in the login data memory area 14*c*.

The CPU 11 displays various data, and menu corresponding to the operating keys 15, and operation state of MFP 1 on the LCD 16. When the user calls with the Internet telephone service by using the MFP 1, the CPU 11 displays contact list on the LCD 16. The contact list is list of usernames that can call with the Internet telephone services.

The speaker 17 provides various notifications to the user in the form of input tones produced when the operating unit 15 are operated, a warning tone produced when an error occurs, and a ring tone signifying an incoming call.

The Internet interface 18 is connected to the wireless communication antenna 18*a* and serves to implement WiFi (Wireless Fidelity) communications with the access point 50. The access point 50 is connected to the Internet 200 and functions to implement an Internet telephone (voice communication) or exchange data with an external device connected to the Internet 200 according to Internet Protocol, such as the first and second Internet telephones 51 and 52.

The scanning unit 19 scans and reads an image from an original set at a prescribed scanning position (not shown) and generates an image data based on the image from the original. The scanned data is used for printing image on the recording paper and is displayed on the LCD 16. If the MFP 1 is set in the facsimile mode, scanner mode, and copy mode, the scanned data is stored in a prescribed storage area of the RAM 13.

The printing unit 20 prints images on a recording paper stacked on a feeding cassette provided in the printing unit 20 (not shown) based on instructions from the CPU 11.

Based on commands from the CPU 11, the modem 21 modulates transmission data stored in the RAM 13 to produce an image signal that can be transmitted over the telephone network 100, and transmits the image signal to the telephone network 100 through the network control unit 22. The modem 21 also receives an image signal from the telephone network 100 via the network control unit 22 and demodulates the image signal into image data that can be displayed on the LCD 16 or printed on the printing unit 20.

The network control unit 22 is connected to the telephone network 100 and performs control processes to transmit a dial signal to the telephone network 100 and to respond to a call signal from the telephone network 100.

The transceiver 23 functions to implement voice communications between the handset 2 and the external devices (not shown) connected to the MFP 1 via the telephone network 100 and for implementing an Internet telephone call with the first Internet telephone 51 or second Internet telephone 52 via the Internet 200. Though not shown in the drawing, the transceiver 23 has a microphone for converting voice to voice signals, and a speaker for converting voice signals to voice and outputting the voice externally.

The timing circuit 24 has an internal timer for keeping track of the current date and time and has a circuit well known in the art for calculating a prescribed time by comparing the date and time at which the timer was started to the current date and time. The timing circuit 24 is used for determining a prescribed time has elapsed in S43 of a login data transmission process shown in FIG. 4. The login data transmission process will be described later.

The digital cordless interface 25 serves to implement wireless communications between the MFP 1 and the handset 2. The cordless antenna 26 is connected to the digital cordless interface 25. When the user implements an Internet telephone with the handset 2 by using the internet telephone service, the handset 2 is connected to the Internet 200 via the digital cordless interface 25, bus line 27, Internet interface 18, and access point 50.

The handset 2 includes primarily a CPU 32, a ROM 33, a RAM 34, a flash memory 35, an operating unit 36, a LCD 37, a transceiver 38, and a digital cordless interface 39. These are connected each other via a bus line 40.

The CPU 32 is a processor that executes various programs stored in the ROM 33, the RAM 34, and the flash memory 35 and various signal sent or received via the digital cordless interface 39. The CPU 11 controls the overall operation of the MFP 1 via the bus line 40.

The ROM 33 is an unrewritable memory that stores a program of a process described later. The ROM 33 includes a control program area 33*a* that stores various control programs executed by the CPU 32. The control program area 33*a* stores the control programs for performing operations shown in FIGS. 6 through 8 described later.

The RAM 34 is a rewritable memory for temporarily storing various data. The RAM 34 is provided with a handset username memory area 34*a*, and a handset login data memory area 34*b*. When the handset 2 is used to implement an Internet telephone, the handset username memory area 34*a* stores the username corresponding to the user using the Internet telephone service, and the handset login data memory area 34*b* stores the Internet telephone service names, account names, and passwords corresponding to the username as handset login data when the MFP 1 transmits this data from among the at least one set of login data stored in the login data memory area 14*c* of the MFP 1.

Here, the handset login data stored in the handset login data memory area 34*b* will be described with reference to FIG. 2B. FIG. 2B conceptually illustrates the handset login data stored in the handset login data memory area 34*b* when the user having username "ABC" attempts to use the Internet telephone service. Each record in the handset login data memory area 34*b* is configured of the storage fields Internet telephone service name 34*b*1, account name 34*b*2, and password 34*b*3.

The Internet telephone name 34b1 is set to the Internet telephone service names transferred from the MFP 1 that correspond to the user using the Internet telephone service. The account name 34b2 is set to the account names transferred from the MFP 1 that correspond to the user using the Internet telephone service. The password 34b3 is set to the passwords transferred from the MFP 1 that correspond to the user using the Internet telephone.

In the example shown in FIG. 2B, the handset login data memory area 34b stores in correlation the Internet telephone service name "First Internet Telephone Service" as the Internet telephone service name 34b1, the account name "abc" as the account name 34b2, and the password "1234" as the password 34b3. Further, the handset login data memory area 34b stores in correlation the Internet telephone service name "Second Internet Telephone Service" as the Internet telephone service name 34b1, the account name "ef3" as the account name 34b2, and the password "abcd" as the password 34b3.

The handset login data stored in the handset login data memory area 34b includes the Internet telephone service names, account names, and passwords applied when the user having username "ABC" attempts to the Internet telephone service (see FIG. 2A). As described above, the handset login data is stored in the handset login data memory area 34b when the MFP 1 transmits the Internet telephone service names, account names, and passwords corresponding to the user using the Internet telephone service selected from among login data stored in the login data memory area 14c, to the handset 2.

As will be described later in detail, when the handset username memory area 34a stores "ABC" as the username of the user using the Internet telephone service, for example, the handset 2 transmits this username "ABC" to the MFP 1. After receiving the username "ABC", the MFP 1 extracts the Internet telephone service names, account names, and passwords corresponding to username "ABC" from the login data stored in the login data memory area 14c and transmits the extracted data to the handset 2. The handset 2 then uses the Internet telephone names, account names, and passwords acquired from the MFP 1 to log into the Internet telephone service.

Hence, when an Internet telephone call is performed using the handset 2, the user authentication data (account name and password) used for login (user authentication) for each Internet telephone service must be set via the handset 2. Further, the Internet telephone service names, account names, and passwords transmitted from the MFP 1 to the handset 2 correspond to the username of the user using the Internet telephone service. Since the MFP 1 fails to transmit, to the handset 2, the Internet telephone names, account names, and passwords of users other than the user performing an Internet telephone call with the handset 2, the MFP 1 can prevent improper use of account names and passwords belong to other users.

Returning to FIG. 1, the flash memory 35 is nonvolatile memory that can be written thereto and read therefrom when the power to the handset 2 is cut off.

The operating unit 36 is configured of a plurality of operating keys, such as numeric keys, all button, and operation buttons. The user can input instructions in the handset 2 by manipulating the operating keys. The operating unit 36 includes an Internet telephone key 36a, alphanumeric keys 36b, and a termination key 36c.

The Internet telephone key 36a is a button used when implementing an Internet telephone with the handset 2 by using an Internet telephone service. When the Internet telephone key 36a is pressed, the handset 2 begins a login data reception process of FIG. 6 for receiving the Internet telephone service names, account names, and passwords from the MFP 1.

The alphanumeric keys 36b are buttons for inputting the username of the user implementing an Internet telephone call with the handset 2 by using the Internet telephone service. The username inputted via the alphanumeric keys 36b is stored in the handset username memory area 34a. The termination key 36c is a button for logging out from all Internet telephones to which the user is currently logged in. When the user presses the termination key 36c, the user is logged out from all Internet telephone services to which the user is currently logged in, regardless of whether the telephone is currently conducting voice communications or is idle.

The CPU 32 displays, on the LCD 37, the contact list and operation state of the handset 2 such as calling state and waiting state, and the like, when the user manages and calls the Internet telephone with the handset 2.

The transceiver 38 functions to implement voice communications between the handset 2 and external devices (not shown) connected to the MFP 1 via the telephone network 100 and for implementing an Internet telephone call with the first Internet telephone 51 and second Internet telephone 52 connected to the MFP 1 via the Internet 200. The transceiver 38 has a microphone and speaker (not shown) for implementing a telephone call. Specifically, the microphone converts voice to a voice signal and outputs the voice signal, while the speaker converts an inputted voice signal to voice and outputs the voice. The speaker outputs input tones when operating the operating unit 36, a warning tone when an error occurs, and a ring tone indicating an incoming call.

The digital cordless interface 39 implements wireless communications between the handset 2 and MFP 1, and includes a cordless antenna 47 connected to the digital cordless antenna 26. When the user of the handset 2 presses the Internet telephone key 36a to implement an Internet telephone call between the handset 2 and the first Internet telephone 51 or second Internet telephone 52, the transceiver circuit 38 is connected to the digital cordless interface 39 in order to connect the handset 2 to the MFP 1 through wireless communications. Subsequently, the handset 2 transmits, to the MFP 1, the Internet telephone service name 34b1 stored in the handset login data memory area 34b. Upon receiving this Internet telephone service name, the MFP 1 selects the Internet telephone program associated with the Internet telephone service name from the Internet telephone program memory area 14a and executes the program. As a consequence, the handset 2 performs a login (user authentication) for the Internet telephone service. After the login to the Internet telephone service is completed, an Internet telephone call can be implemented between the handset 2 and the first Internet telephone 51 or second Internet telephone 52.

Figure 3B:
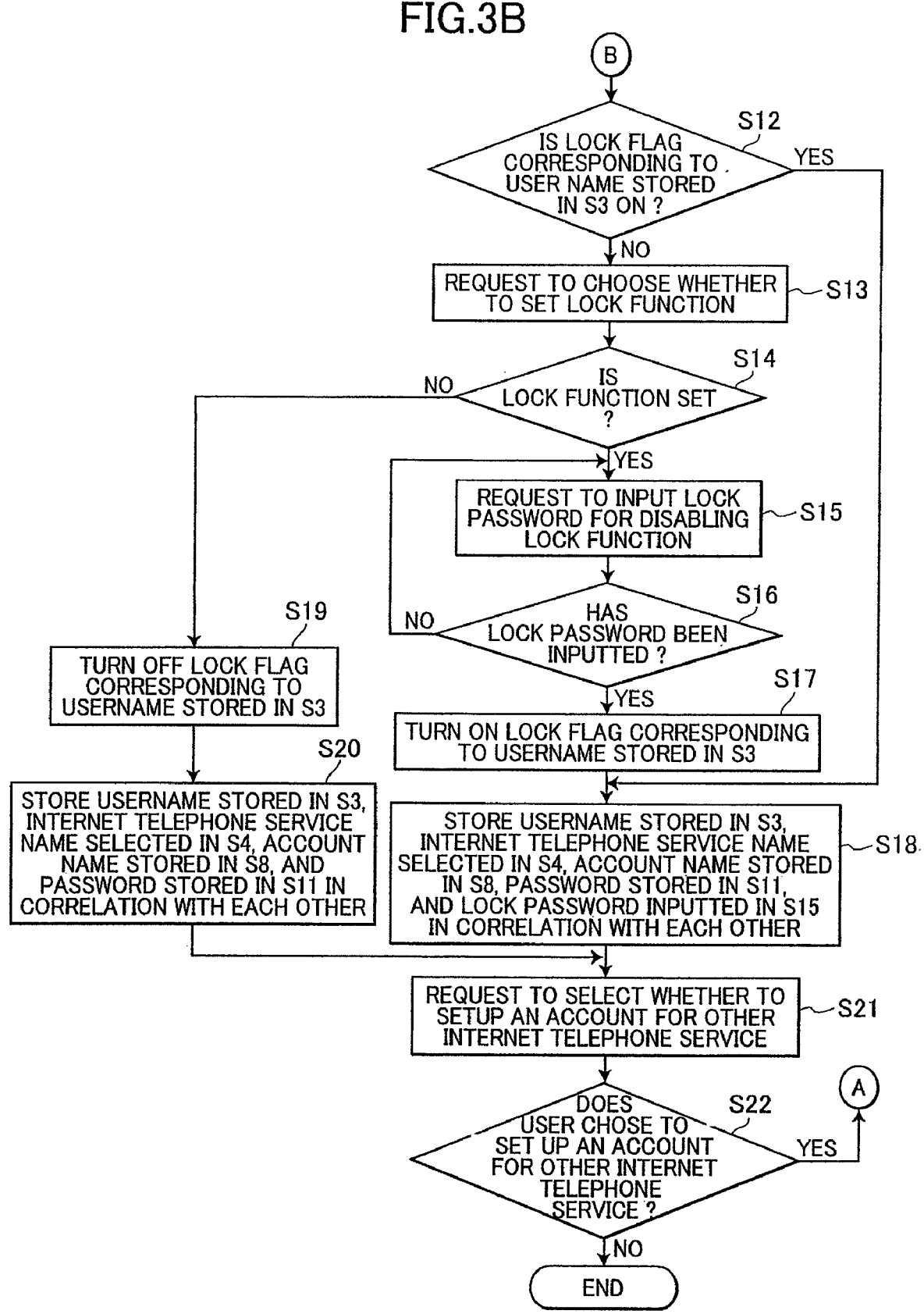

Next, the login data creation process executed on the MFP 1 will be described with reference to FIGS. 3A and 3B. The CPU 11 of the MFP 1 executes this process when the user presses the login data creation key 15a. The login data creation process serves to create the login data to be stored in the login data memory area 14c.

In S1 of the login data creation process, the CPU 11 requests the user to input a username that will be associated with an account name and password set later. The CPU 11 may issue the request for input by displaying "Please enter a username" on the LCD 16, for example. In S2 the CPU 11 determines whether a username has been inputted. If the user name has not been inputted (S2: NO), the CPU 11 returns to S1. When the CPU 11 determines that the username was inputted (S2: YES), in S3 the CPU 11 stores the inputted username in the username memory area 13c.

In S4 the CPU 11 prompts the user to select an Internet telephone service name from among Internet telephone service names stored in the Internet telephone service name memory area 14b, for which Internet telephone service name an account name and password will later be assigned. The CPU 11 prompts the user to select an Internet telephone service name by displaying the message "Please select an Internet telephone service name corresponding to the internet telephone service to be assigned an account name and password" on the LCD 16, for example. In S5 the CPU 11 determines whether the Internet telephone service name was selected. If the CPU 11 determines that the Internet telephone service was not selected (S5: NO), the CPU 11 returns to S4.

However, when the CPU 11 determines that an Internet telephone name was selected (S5: YES), in S6 the CPU 11 prompts the user to input an account name for use in logging in to the Internet telephone service corresponding to the selected Internet telephone name. The CPU 11 performs this request by displaying "Please enter an account name" on the LCD 16, for example.

In S7 the CPU 11 determines whether an account name was inputted. If the CPU 11 determines that the account name was not inputted (S7: NO), the CPU 11 returns to S6. However, when the CPU 11 determines that the account name is inputted (S7: YES), in S8 the CPU 11 stores the inputted account name in the account name memory area 13a.

In S9 the CPU 11 prompts the user to input a password to be used for logging into the Internet telephone service corresponding to the selected Internet telephone service name. The CPU 11 performs this request by displaying "Please enter a password" on the LCD 16, for example. Subsequently, in S10 the CPU 11 determines whether a password was inputted. If the CPU 11 determines that a password was not inputted (S10: NO), the CPU 11 returns to S9. When the CPU 11 determines that a password was inputted (S10: YES), in S11 the CPU 11 stores the inputted password in the password memory area 13b.

In S12 the CPU 11 determines whether the lock flag 14d1-14d3 corresponding to the username stored in the account name memory area 13a is on. If the lock flag 14d1-14d3 is on (S12: YES), then the lock function has already been set to restrict usage of the account name and password corresponding to this username. Hence, the CPU 11 skips the process in S13-S17 for setting the lock function and jumps to S18.

However, if the lock flag 14d1-14d3 corresponding to the username stored in the account name memory area 13a is off (S12: NO), in S13 the CPU 11 prompts the user to choose whether to set the lock function. Specifically, the CPU 11 may display the message "Would you like to use the lock function?" on the LCD 16, for example. In S14 the CPU 11 then determines whether the user chose to use the lock function.

If the CPU 11 determines that the user chose to use the lock function (S14: YES), in S15 the CPU 11 prompts the user to input a lock password for disabling the lock function about to be set. Specifically, the CPU 11 displays the message "Please enter a lock password" on the LCD 16, for example. In S16 the CPU 11 determines whether a lock password was inputted. If the CPU 11 determines that a lock password has not been inputted (S16: NO), the CPU 11 returns to S15.

When the CPU 11 determines that a lock password was inputted (S16: YES), in S17 the CPU 11 turns on the lock flag 14d1-14d3 corresponding to the username stored in the username memory area 13c. In S18 the CPU 11 stores, in the login data memory area 14c, the username stored in the username memory area 13c, the inputted lock password, the selected Internet telephone service name, the account name stored in the account name memory area 13a, and the password stored in the password memory area 13b in correlation with each other. After storing the username, lock password, Internet telephone service name, account name, and password in the login data memory area 14c, the CPU 11 deletes the username, account name, and password from the username memory area 13c, account memory area 13a, and password memory area 13b, respectively.

Using an example in FIG. 2A, the login data memory area 14c now stores "ABC" as the username 14c1, "3523" as the lock password 14c2, "First Internet Telephone" as the Internet telephone name 14c3, "abc" as the account name 14c4, and "1234" as the password 14c5 after the CPU 11 performs the process in S18.

If the CPU 11 determines that the user did not choose to use the lock function (S14: NO), the CPU 11 sets the lock flag 14d1-14d3 corresponding to the username stored in the username memory area 13c to off in S19. In S20 the CPU 11 stores the username in the username memory area 13c, the selected Internet telephone service name, the account name stored in the account name memory area 13a, and the password stored in the password memory area 13b in the login data memory area 14c in correlation with each other. After storing the username, lock password, Internet telephone service name, account name, and password in the login data memory area 14c, the CPU 11 deletes the username, account name, and password from the username memory area 13c, account memory area 13a, and password memory area 13b, respectively.

Again using an example in FIG. 2A, the login data memory area 14c now stores "RST" as the username 14c1, "Null" as the lock password 14c2, "Second Internet Telephone Service" as the Internet telephone service name 14c3, "asw" as the account name 14c4, and "aaca" as the password 14c5 after the CPU 11 performs the process in S20.

After performing the process in either S18 or S20, in S21 the CPU 11 prompts the user to select whether to setup an account for other Internet telephone service. Specifically, the CPU 11 may display the message "Please select whether to set up an account for other Internet telephone service" on the LCD 16, for example. Next, the CPU 11 determines whether the user chose to set up an account for another Internet telephone. If the user chose to set up an account (S22: YES), the CPU 11 returns to S4 and repeats the process described above. However, if the user chose not to set up an account (S22: NO), the CPU 11 ends the login data creation process.

By executing the login data creation process described above, the CPU 11 stores a username, lock password, Internet telephone service name, account name, and password in the login data memory area 14c as login data, as illustrated in FIG. 2A.

Figure 4:
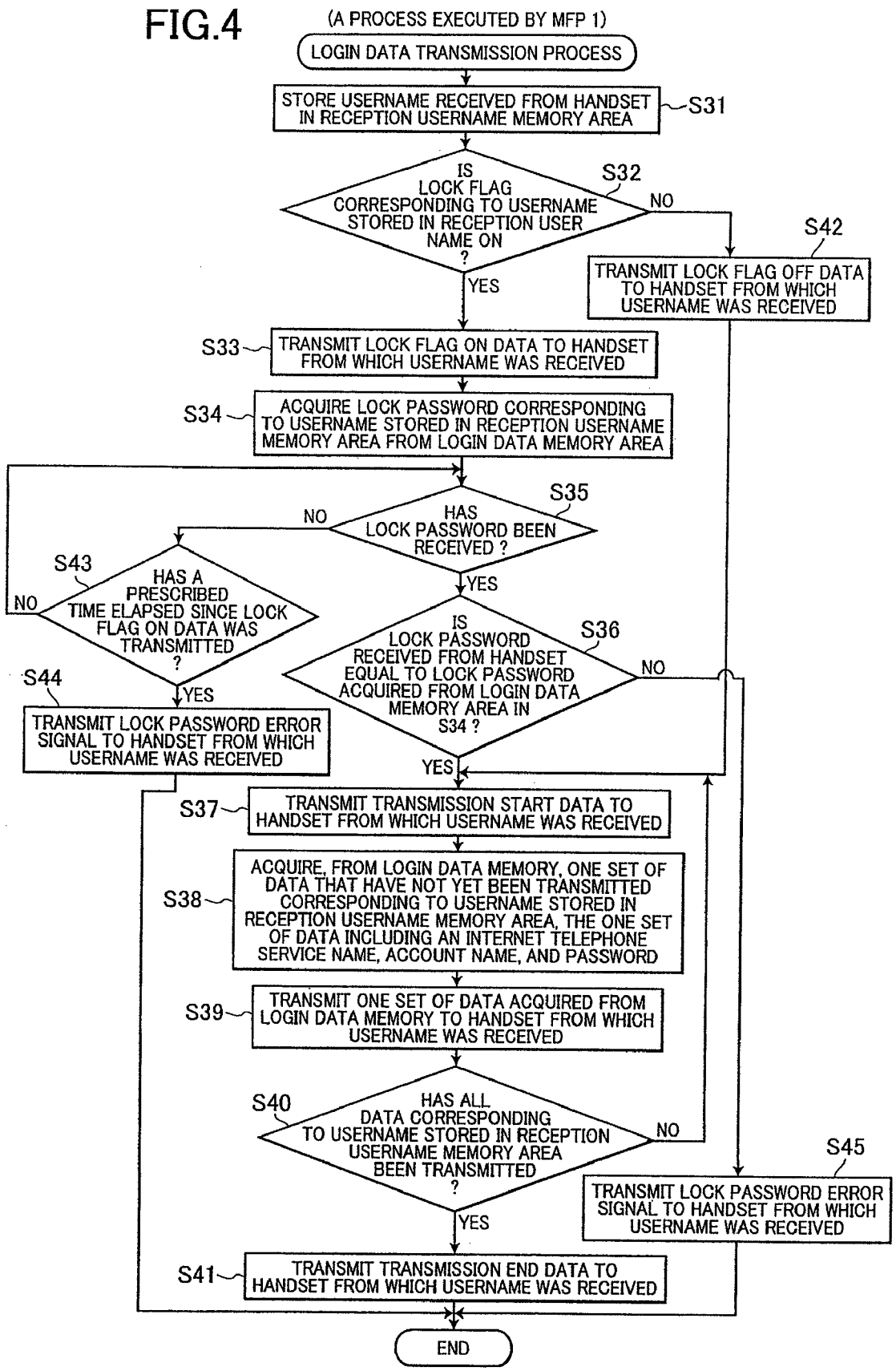
FIG. 4 is a flowchart illustrating steps in a login data transmission process executed by the base unit.

Next, the login data transmission process executed on the MFP 1 will be described with reference to FIG. 4. The CPU 11 executes this process upon receiving a login data request signal and the username of a user performing an Internet telephone call with the handset 2 transmitted from the handset 2. The request signal is a signal requesting the transmission of a portion of login data stored in the login data memory area 14c. The login data transmission process is performed to transmit the Internet telephone service name, account name, and password from login data stored in the login data memory area 14c that corresponds to the username of the user performing an Internet telephone call with the handset 2.

In S31 of the login data transmission process, the CPU 11 stores the username received from the handset 2 in the reception username memory area 13d, the reception username memory area 13d storing the username of the user that attempts to perform an Internet telephone call with the handset 2. In S32 the CPU 11 determines whether the lock flag 14d1-14d3 corresponding to the username stored in the reception username memory area 13d is on. If the corresponding lock flag 14d1, 14d2, or 14d3 is on (S32: YES), the user has set the lock function restricting usage of the account name and password. Accordingly, in S33 the CPU 11 transmits lock flag ON data to the handset 2 from which the username was received, indicating a request for the transmission of a lock password to disable the lock function. Upon receiving the lock flag ON data from the MFP 1, the handset 2 prompts the user performing the Internet telephone call with the handset 2 to input the lock password. When a lock password has been inputted, the handset 2 transmits this lock password to the MFP 1.

In S34 the CPU 11 acquires the lock password corresponding to the username stored in the reception username memory area 13d from the login data memory area 14c in order to determine whether the lock password received from the handset 2 is correct. In S35 the CPU 11 determines whether a lock password was received from the handset 2. If a lock password was not received (S35: NO), in S43 the CPU 11 determines whether a prescribed time has elapsed since the lock flag ON data was transmitted. If the prescribed time has elapsed (S43: YES), in S44 the CPU 11 transmits a lock password error signal indicating that a lock password was not received to the handset 2 from which username was received, and subsequently ends the login data transmission process. However, if the time elapsed since the lock flag ON data was transmitted has not reached the prescribed time (S43: NO), the CPU 11 returns to S35 and determines whether a lock password was received.

If the CPU 11 determines in S35 that a lock password was received (S35: YES), in S36 the CPU 11 determines whether the lock password received from the handset 2 is the same as the lock password acquired from the login data memory area 14c in S34. If the lock password received from the handset 2 is the same as the lock password acquired from the login data memory area 14c (S36: YES), in S37 the CPU 11 transmits, to the handset 2, transmission start data indicating that the MFP 1 will begin transmitting the Internet telephone names, account names, and passwords from the login data stored in the login data memory area 14c. Upon receiving the transmission start data, the handset 2 prepares to receive this data from the MFP 1.

In S38 the CPU 11 extracts, from the login data memory area 14c, one set of data that have not yet been transferred corresponding to the username stored in the reception username memory area 13d. The one set of data includes an Internet telephone service name, account name, and password. For example, if the username stored in the reception username memory area 13d is "ABC", in S38 the CPU 11 acquires a set of data from the login data memory area 14c including the Internet telephone service name "First Internet Telephone Service," the account name "abc," and the password "1234" (see FIG. 2A). If the set of data including the Internet telephone service name "First Internet Telephone Service," the account name "abc," and the password "1234" has already been transmitted to the handset 2, then in S38 the CPU 11 acquires the set of data from the login data memory area 14c including the Internet telephone service name "Second Internet Telephone Service," the account name "ef3," and the password "abcd."

After acquiring the authentication data in S38, in S39 the CPU 11 transmits the set of data to the handset 2. In S40 the CPU 11 determines whether all sets of authentication data corresponding to the username stored in the reception username memory area 13d has been transmitted. If there remains some data to be transmitted (S40: NO), the CPU 11 returns to S37 and repeats the process in S37-S39 described above.

However, if the CPU 11 determines in S40 that all sets of authentication data corresponding to the username stored in the reception username memory area 13d has been transmitted (S40: YES), in S41 the CPU 11 transmits transmission end data to the handset 2 indicating that transmission of the Internet telephone service names, account names, and passwords is complete, and subsequently ends the login data transmission process. Upon receiving this transmission end data, the handset 2 ends the reception process.

Further, if the CPU 11 determines in S32 that the lock flag 14d1-14d3 corresponding to the username stored in the reception username memory area 13d is off (S32: NO), indicating that the lock function restricting usage of the account name and password has not been set, in S42 the CPU 11 transmits lock flag OFF data to the handset 2 indicating that the lock function has not been set, and subsequently advances to S37 described above. After receiving the lock flag OFF data, the handset 2 fails to transmit a lock password to the MFP 1.

Further, if the CPU 11 determines in S36 that the lock password received from the handset 2 does not match the lock password acquired from the login data memory area 14c in S34 (S36: NO), in S45 the CPU 11 transmits a lock password error signal to the handset 2 indicating that the lock password received from the handset 2 is incorrect, and subsequently ends the login data transmission process.

Through the login data transmission process described above, the CPU 11 can transmit Internet telephone service names, account names, and passwords corresponding to the username of a user performing an Internet telephone call with the handset 2 from among login data stored in the login data memory area 14c.

Next, a logout signal transmission process executed by the MFP 1 will be described with reference to FIG. 5. FIG. 5 is a flowchart illustrating steps in the logout signal transmission process. The CPU 11 executes this process upon receiving an Internet telephone terminate signal from the handset 2. The logout signal is a signal requesting the end of an Internet telephone call). The logout signal transmission process serves to transmit a logout signal to all handsets, directing the handsets to logout from all Internet telephone services to which the handsets are logged in.

In S51 of the logout signal transmission process, the CPU 11 transmits a logout signal to all handsets. In S52 the CPU 11 determines whether a logout complete signal was received from all handsets, indicating that the handsets logged out from all Internet telephone services to which the handsets were previously logged in. If the CPU 11 determines that a logout complete signal was not received from all handsets (S52: NO), the CPU 11 returns to S51 and repeats the transmission of a logout signal to all handsets. However, when the CPU 11 determines that a logout complete signal was received from all handsets (S52: YES) the CPU 11 ends the logout signal transmission process.

Figure 6B:
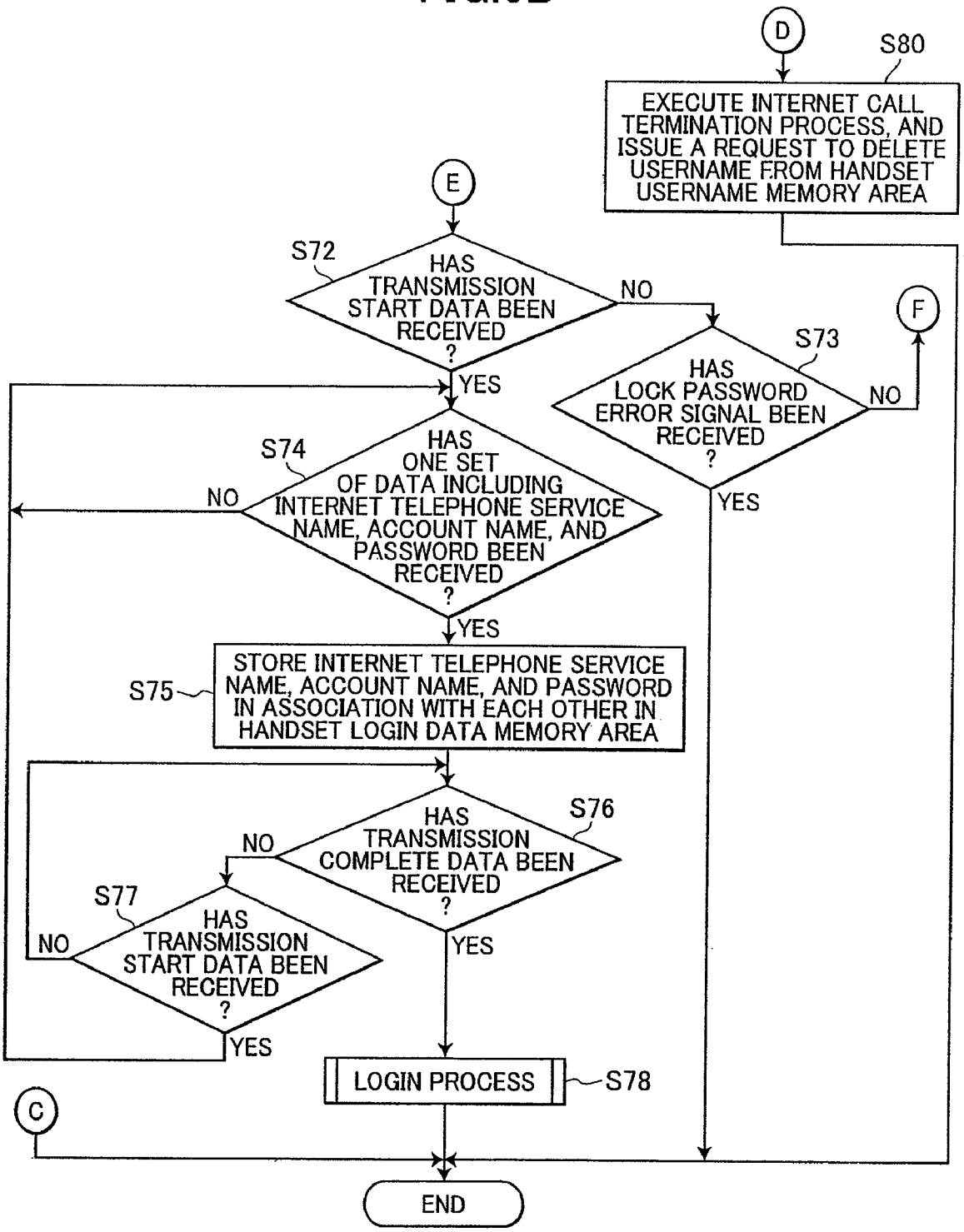

Next, a login data reception process executed on the handset 2 will be described with reference to FIGS. 6A and 6B. FIGS. 6A and 6B are flowchart illustrating steps in the login data reception process. The CPU 32 of the handset 2 executes this process when the user presses the Internet telephone key 36a on the handset 2. The login data reception process serves to receive Internet telephone service names, account names, and passwords from the MFP 1 corresponding to the username of the user performing an Internet telephone call with the handset 2.

In S61 of the login data reception process, the CPU 32 determines whether wireless communications with the MFP 1 are possible. The determination in S61 is made based on whether the handset 2 can receive a signal periodically transmitted from the digital cordless interface 25 of the MFP 1. If the CPU 32 determines that wireless communications with the MFP 1 are not possible (S61: NO), in S79 the CPU 32 issues a request to establish wireless communications with the MFP 1, and subsequently ends the login data reception process. The CPU 32 makes the request in S79 by displaying the message "Please move closer to the MFP 1" on the LCD 37, for example. When the CPU 32 determines that wireless communications with the MFP 1 are possible (S61: YES), in S62 the CPU 32 determines whether a username is currently stored in the handset username memory area 34a. In other words, the CPU 32 determines whether the handset 2 communicates with the external device by using the Internet telephone service.

If a username is currently stored in the handset username memory area 34a (S62: YES), then the user is already logged into an Internet telephone with the handset 2. Therefore, in S80 the CPU 32 executes an Internet call termination process described later with reference to FIG. 8, logs out from the Internet telephone service to which the user is currently logged in, and issues a request to delete the username from the handset username memory area 34a. Subsequently, the CPU 32 ends the login data reception process.

However, when the CPU 32 determines that a username is not stored in the handset username memory area 34a (S62: NO), indicating that the user is not currently logged into an Internet telephone service, in S63 the CPU 32 requests the user to input a username for implementing an Internet telephone call with the handset 2 by using the internet telephone service. In other words, the CPU 32 requests the user to input a username when the handset 2 attempts to communicate with the external device by using the Internet telephone service and the CPU 32 determines that the handset 2 fails to communicate with the external device by using the Internet telephone service now.

In S64 the CPU 32 determines whether a username has been inputted. If the CPU 32 determines that the user has not inputted a username (S64: NO), the CPU 32 returns to S63. When the CPU 32 determines that a username has been inputted (S64: YES), the CPU 32 stores the username in the handset username memory area 34a in S65.

In S66 the CPU 32 transmits the username stored in the handset username memory area 34a together with a login data request signal to the MFP 1. Upon receiving the login data request signal, the MFP 1 begins' executing the login data transmission process described earlier with reference to FIG. 4.

In S67 the CPU 32 determines whether lock flag ON data was received. If lock flag ON data was not received (S67: NO), in S68 the CPU 32 determines whether lock flag OFF data was received. If the CPU 32 determines that lock flag OFF data was not received (S68: NO), the CPU 32 returns to S67 and repeats the processes in S67 and S68 until either lock flag ON data or lock flag OFF data is received.

When the CPU 32 determines that lock flag ON data was received (S67: YES), indicating that the user implementing an Internet telephone call with the handset 2 has set the lock function for restricting usage of the account name and password, in S69 the CPU 32 prompts the user to input a lock password for disabling the lock function. The CPU 32 prompts the user by displaying the message "Please enter the lock password" on the LCD 37, for example. In S70 the CPU 32 determines whether a lock password was inputted. If the CPU 11 determines that a lock password has not been inputted (S70: NO), the CPU 11 returns to S69.

When the CPU 32 determines that a lock password was inputted (S70: YES), in S71 the CPU 32 transmits the inputted lock password to the MFP 1. Upon receiving this lock password, the MFP 1 determines in the login data transmission process (S36 of FIG. 4) whether the lock password received from the handset 2 is correct. In other words, the MFP 1 determines whether the lock password transmitted from the handset 2 matches the lock password 14c2 stored in the login data memory area 14c. If the MFP 1 determines that the lock password is correct, the MFP 1 returns transmission start data to the handset 2 (S37 of FIG. 4). However, if the MFP 1 determines that the lock password is incorrect, the MFP 1 returns a lock password error signal to the handset 2 (S45 of FIG. 4).

After completing the process in S71, in S72 the CPU 32 determines whether transmission start data was received. Here, if lock flag OFF data was received in S68 (S68: YES), indicating that the lock function has not been set, the CPU 32 skips the process in S69-S71 and jumps to S72. If the CPU 32 determines in S72 that transmission start data was not received (S72: NO), in S73 the CPU 32 determines whether a lock password error signal was received. If a lock password error signal was not received (S73: NO), then the CPU 32 returns to S72 and repeats the process in S72-S73 until either transmission start data or a lock password error signal are received. If the CPU 32 determines in S73 that a lock password error signal was received (S73: YES), indicating that the lock password transmitted in S71 is incorrect, the CPU 32 ends the login data reception process.

On the other hand, if the CPU 32 determines in S72 that transmission start data was received (S72: YES), in S74 the CPU 32 determines whether the authentication data including the Internet telephone service name, account name, and password is received from the MFP 1. If this authentication data was not received (S74: NO), the CPU 32 repeats the process in S74 until the Internet telephone service name, account name, and password are received.

When the CPU 32 determines in S74 that the authentication data including the Internet telephone service name, account name, and password has been received, from the MFP 1 (S74: YES), in S75 the CPU 32 stores the received Internet telephone name, account name, and password in association with each other in the handset login data memory area 34b. If the CPU 32 transmitted the username "ABC" to the MFP 1 in S66, for example, in S75 the CPU 32 stores "First Internet Telephone Service" as the Internet telephone service name 34b1, "abc" as the account name 34b2, and "1234" as the password 34b3 in the handset login data memory area 34b, as shown in FIG. 2A.

After performing the process in S75, in S76 the CPU 32 determines whether transmission complete data has been received from the MFP 1. If the transmission complete data has not been received (S76: NO), in S77 the CPU 32 determines whether transmission start data has been received. If transmission start data has not been received (S77: NO), the CPU 32 repeatedly performs the process in S76-S77 until either transmission complete data or transmission start data is received.

If the CPU 32 determines in S77 that transmission start data has been received (S77: YES), the CPU 32 returns to S74 and repeats the process in S74-S77 described above.

The transmission start data is data indicating that the MFP 1 will transmit other Internet, telephone service name, account name, and password. If the CPU 32 transmitted the username "ABC" to the MFP 1 in S66, for example, by repeating the process in S74-S77 the CPU 32 will store "Second Internet Telephone Service" as the Internet telephone service name 34*b*1, "ef3" as the account name 34*b*2, and "abcd" as the password 34*b*3 in the handset login data memory area 34*b*, as shown in FIG. 2B.

When transmission complete data is received (S76: YES), indicating that the CPU 32 has received from the MFP 1 all Internet telephone service names, account names, and passwords corresponding to the username transmitted to the MFP 1 in S66, the CPU 32 advances to the login process of S78 described later with reference to FIG. 7. After completing the login process of S78, the CPU 32 ends the login data reception process.

Through the login data reception process described above, the CPU 32 can receive Internet telephone service names, account names, and passwords from the MFP 1 corresponding to the username of the user implementing an Internet telephone call with the handset 2, and can store the received data in the handset login data memory area 34*b*.

Further, through this login data reception process, the handset 2 transmits a login data request signal to the MFP 1 when the handset 2 has a reliable connection with the MFP 1 through wireless communications. Hence, the handset 2 can reliably receive the Internet telephone service names, account names, and passwords from the MFP 1.

Further, in the login data reception process, the handset 2 transmits a login data request signal to the MFP 1 when a username is not stored in the handset username memory area 34*a*. Accordingly, the handset 2 can prevent the transmission of a login data request signal from the handset 2 to the MFP 1 and transmission of Internet telephone service names, account names, and passwords from the MFP 1 to the handset 2 when a username is currently stored in the handset username memory area 34*a*, i.e., when the user is already logged into the Internet telephone service with the handset 2.

Next, the login process executed on the handset 2 will be described with reference to FIG. 7. The login process is performed to log into an Internet telephone service using the Internet telephone service names, account names, and passwords received from the MFP 1 and corresponding to the username of the user implementing the Internet telephone call.

In S91 of the login process, the CPU 32 selects one Internet telephone service name from the Internet telephone service names 34*b*1 that has not yet been used in an attempt to log into the Internet telephone service. The process in S91 may be implemented by allowing the user implementing an Internet telephone call with the handset 2 to select an Internet telephone service from the Internet telephone service names 34*b*1 that has not yet been tried.

In S92 the CPU 32 displays a login window for the Internet telephone service corresponding to the selected Internet telephone service name. In this process, the handset 2 transmits the selected Internet telephone service name to the MFP 1. Upon receiving the Internet telephone service name from the handset 2, the MFP 1 selects the Internet telephone program associated with the Internet telephone service name from the Internet telephone program memory area 14*a*. The MFP 1 activates the Internet telephone service by executing the selected Internet telephone program and transmits the login window for the activated Internet telephone service to the handset 2 via the digital cordless interface 25. Consequently, the handset 2 can display the login window.

In S93 the CPU 32 determines whether the login window has been displayed. If the CPU 32 determines that the login window has not been completely displayed (S93: NO), the CPU 32 repeatedly loops back to S92 until display of the login window is complete. When the login window has been displayed (S93: YES), in S94 the CPU 32 acquires the account name corresponding to the selected Internet telephone service name from the handset login data memory area 34*b* and inputs this account name in the relevant field of the login window. For example, if the various data shown in FIG. 2B (Internet telephone service names, account names, and passwords) are stored in the handset login data memory area 34*b* and the Internet telephone service name "First Internet Telephone Service" was selected in S91, then in S94 the CPU 32 acquires the account name "abc" from the account names 34*b*2 and inputs this account name in the corresponding field of the login window.

In S95 the CPU 32 acquires the password corresponding to the selected Internet telephone service name from the handset login data memory area 34*b* and inputs this password into the corresponding field of the login window. For example, if the various data shown in FIG. 2B is stored in the handset login data memory area 34*b* and the Internet telephone service name "First Internet Telephone Service" was selected in S91, then in S95 the CPU 32 acquires the password "1234" from the passwords 34*b*3 and inputs this password into the corresponding field of the login window.

In S96 the CPU 32 determines whether the login process to the Internet telephone service was successful. Specifically, the CPU 32 transmits the account name inputted into the corresponding field of the login window in S94 and the password inputted into the corresponding field of the login window in S95 to the MFP 1. Upon receiving the account name and password, the MFP 1 accesses the server managing the Internet telephone call using the activated Internet telephone service and attempts to log into the Internet telephone service using the received account name and password. Subsequently, the MFP 1 transmits the results of the login process to the handset 2. The handset 2 then makes the determination in S96 based on the results of the login attempt received from the MFP 1.

If the login was successful (S96: YES), in S97 the CPU 32 places the selected Internet telephone into a call-enabled state. However, when login was unsuccessful (S96: NO), in S98 the CPU 32 reports that the password used to log into the selected Internet telephone service was incorrect by displaying the message "Password incorrect" on the LCD 37, for example.

After completing the process in either S97 or S98, in S99 the CPU 32 determines whether a login trial was completed for Internet telephones corresponding to all Internet telephone service names stored in the handset login data memory area 34*b*. For example, when the authentication data stored in FIG. 2B is stored in the handset login data memory area 34*b*, in S99 the CPU 32 determines whether a login attempt has been made for Internet telephone calls corresponding to the Internet telephone names "First Internet Telephone Service" and "Second Internet Telephone Service."

If the CPU 32 determines in S99 that a login attempt has not been performed for Internet telephone calls corresponding to all Internet telephone service names stored in the handset login data memory area 34*b* (S99: NO), the CPU 32 returns to S91 and repeats the process in S91-S99 described above.

However, if the CPU 32 determines that a login attempt was made for the Internet telephone calls corresponding to all Internet telephone service names (S99: YES), the CPU 32 ends the login process.

Through the login process described above, the handset 2 logs into the Internet telephone service using the account name and password received from the MFP 1 that corresponds to the username for the user implementing the Internet telephone. Accordingly, when implementing an Internet telephone with the handset 2, the user need not input any account names and passwords for use in the login process, thereby eliminating troublesome operations to input account names and passwords for logging into the Internet telephone services.

Next, an Internet call termination process executed on the handset 2 will be described with reference to FIG. 8. The CPU 32 of the handset 2 executes this process when the termination key 36c of the handset 2 is pressed. The Internet call termination process serves to log out the user from an Internet telephone to which the user is logged in with the handset 2 and subsequently to delete the data stored in the handset username memory area 34a and handset login data memory area 34b.

In S111 at the beginning of the Internet call termination process, the CPU 32 transmits an Internet telephone terminate signal to the MFP 1 instructing the MFP 1 to log out from the Internet telephone services. Upon receiving this Internet telephone terminate signal, the MFP 1 transmits a logout signal to all handsets instructing the handsets to log out from all Internet telephones currently in use (S51 of FIG. 5).

In S112 the CPU 32 determines whether a logout signal was received from the MFP 1. If a logout signal was not received (S112: NO), the CPU 32 repeats the process in S111 until a logout signal is received. When a logout signal is received (S112: YES), in S113 the CPU 32 determines whether there exists an Internet telephone service into which the user is logging via the MFP 1. In other words, the CPU 32 determines in S113 whether there exists an Internet telephone service still in use via the MFP 1. Here, when handset 2 whose operators did not press the termination key 36c to execute the Internet call termination process receive a logout signal from the MFP 1, this handset 2 skips the process in S111-S112 of the Internet call termination process and begin executing the process from S113. Hence, when handset 2 receives a logout signal from the MFP 1, all handset 2 execute the process from S113 in FIG. 8.

If the CPU 32 determines in S113 that no Internet telephones are currently in use via the MFP 1 (S113: NO), in S120 the CPU 32 transmits a logout complete signal to the MFP 1 and subsequently ends the Internet call termination process. However, if the CPU 32 determines that there exists an Internet telephone currently in use via the MFP 1 (S113: YES), in S114 the CPU 32 selects one Internet telephone service from among the Internet telephone services in use via the MFP 1.

In S115 the CPU 32 logs out from the selected Internet telephone service. In S116 the CPU 32 determines whether the logout operations was successfully completed. In the process of S115, the handset 2 transmits the Internet telephone name corresponding to the selected Internet telephone service to the MFP 1. Upon receiving this Internet telephone name, the MFP 1 accesses the server managing the Internet telephone service corresponding to the Internet telephone service name and logs out from the Internet telephone. The MFP 1 then transmits data to the handset 2 indicating that the logout was successfully completed. Subsequently, the MFP 1 quits execution of the Internet telephone program corresponding to the Internet telephone service from which the MFP 1 just logged out. Hence, in S116 the CPU 32 determines whether data was received from the MFP 1 indicating that logout was successfully completed.

If logout was not successfully completed (S116: NO), the CPU 32 repeatedly executes the process in S115 until logout from the selected Internet telephone service is successful. When the CPU 32 determines that logout was successfully completed (S116: YES), in S117 the CPU 32 determines whether logout has been completed for all Internet telephone services to which the handset 2 was logged in. If the CPU 32 determines that logout has not been completed for all Internet telephone services (S117: NO), the CPU 32 repeatedly executes the process in S114-S117 until logout is completed for all Internet telephone services. When the CPU 32 determines in S117 that logout was successful for all Internet telephones to which the handset 2 was logged in (S117: YES), in S118 the CPU 32 deletes all Internet telephone names, account names, and passwords from the handset login data memory area 34b.

In S119 the CPU 32 deletes the username from the handset username memory area 34a and subsequently in S120 transmits a logout complete signal to the MFP 1. When the MFP 1 receives the logout complete signal from all handsets 2, the MFP 1 halts transmission of the logout signal to all handsets 2 (see FIG. 5).

Through the Internet call termination process described above, all handsets 2 execute the process in S113-S120 upon receiving a logout signal from the MFP 1. As a result, the handset 2 is logged out from all Internet telephone services to which the handset 2 was previously logged in, thus preventing a user from forgetting to log out from an Internet telephone service.

Further, all data stored in the handset username memory area 34a and handset login data memory area 34b provided in all handsets is deleted. By not leaving the username in the handset username memory area 34a of the handset 2 and by not leaving the account names and passwords in the handset login data memory area 34b of the handset 2, a third party is prevented from using these account names and passwords.

According to the communication device T described above, the handset 2 logs into an Internet telephone service using an account name and password transmitted from the MFP 1 for the username of the user implementing the Internet telephone call. Hence, when implementing an Internet telephone call with the handset 2, the user never has to input account names and passwords to log into the Internet telephone service, avoiding needless operations for inputting account names and passwords.

While the invention has been described in detail with reference to the embodiment thereof, it would be apparent to those skilled in the art that various changes and modifications may be made therein without departing from the spirit of the invention.

Further, with the communication device T, the MFP 1 transmits Internet telephone names, account names (user IDs), and passwords to the handset 2 for the username of the user implementing the Internet telephone call. Here, an account name assigned to each user implementing an Internet telephone call and a password assigned for each account name is generally required for logging into an Internet telephone service. Accordingly, the communication device T can reduce the time required for the handset 2 to receive data from the MFP 1 by transmitting only the minimum data required for logging into the Internet telephone service, thereby reducing the time that the user has to wait until a login attempt is made.

In the communication device T of the embodiment described above, the handset 2 is capable of communicating with the first Internet telephone 51 and second Internet telephone 52 through wireless communications with the access point 50 via the MFP 1 by using the Internet telephone service, but the present invention is not limited to this configuration. For example, the handset 2 may be configured to communicate with the first Internet telephone 51 and second Internet telephone 52 through direct wireless communications with the access point 50, not via the MFP 1. In this configuration, the flash memory 35 of the handset 2 is provided with an Internet telephone memory area for storing the first Internet telephone program for implementing voice communications with the first Internet telephone 51 and the second Internet telephone program for implementing voice communications with the second Internet telephone 52. The handset 2 may also be provided with an Internet interface connected to an antenna for wireless communications and connected to the bus line 40. With this configuration, the handset 2 can communicate wirelessly and directly with the access point 50 using the Internet interface and can perform voice communications with the first and second Internet telephones 51 and 52 without going through the MFP 1.

In the communication device T according to the embodiment described above, the handset 2 determines whether wireless communications with the MFP 1 are possible in the login data reception process (S61 of FIG. 6); but the present invention is not limited to this configuration. For example, the MFP 1 may be configured to determine whether wireless communications with the handset 2 are possible. In this case, the handset 2 transmits a response signal to the MFP 1 upon receiving a signal periodically transmitted from the MFP 1. Upon receiving the response signal, the MFP 1 may determine that wireless communications with the handset 2 are possible.

In the communication device T according to the embodiment described above, the handset 2 logs out from the Internet telephone upon receiving a logout signal from the MFP 1, but the present invention is not limited to this configuration. For example, the handset 2 may be provided with a logout key for logging out from an Internet telephone. When the user presses the logout key, the handset on which the logout key was pressed, may be configured to log out from all Internet telephones to which the handset is logged in. In this case, each handset logs out from Internet telephones independently.

In the communication device T according to the embodiment described above, the account names (user IDs) and passwords stored in the login data memory area 14c are created in the login data creation process (see FIGS. 3A and 3B) executed on the MFP 1, but the present invention is not limited to this configuration. For example, if the account name and password to be used for logging into an Internet telephone are pre-stored on a personal computer capable of communicating with the MFP 1, the MFP 1 can acquire the account name and password from the personal computer and store this data in the login data memory area 14c. With this configuration, the user need not perform operations to input the account name and password to be stored in the login data memory area 14c in the login data creation process (see FIGS. 3A and 3B).

What is claimed is:

1. A communication device comprising:
a base unit; and
a handset,
the base unit comprising:
a first communication unit that is configured to communicate with an external device by using a communication service subject to setting authentication data into the communication service;
an authentication data storing unit that stores the authentication data; and
an authentication data transmitting unit that transmits the authentication data to the handset, and
the handset comprising:
a second communication unit that is configured to communicate with the external device by using the communication service subject to setting authentication data into the communication service;
an authentication data receiving unit that receives the authentication data transmitted from the authentication data transmitting unit; and
a setting unit that sets the authentication data received by the authentication data receiving unit into the communication service when the second communication unit attempts to communicate with the external device by using the communication service,
wherein the base unit further comprises a third communication unit that is configured to establish a communication between the base unit and the handset;
wherein the handset further comprises:
a first determining unit that determines whether the third communication unit establishes the communication between the base unit and the handset; and
a requesting unit that transmits, to the authentication data transmitting unit, a request for transmitting the authentication data to the authentication data receiving unit when the first determining unit determines that the third communication unit establishes the communication between the base unit and the handset; and
wherein the authentication data transmitting unit transmits the authentication data to the authentication data receiving unit when the authentication data transmitting unit receives the request from the requesting unit.

2. The communication device according to claim 1, wherein the third communication unit is configured to establish the communication between the base unit and the handset wirelessly.

3. The communication device according to claim 1, further comprising a second determining unit that determines whether the second communication unit has communicated with the external device, and
wherein the requesting unit transmits the request to the authentication data transmitting unit, when the second determining unit determines that the second communication unit fails to communicate with the external device and the second communication unit attempts to communicate with the external device by using the communication service.

4. The communication device according to claim 1, wherein the second communication unit is configured to communicate with the external device via the first communication unit and third communication unit.

5. A communication device comprising:
a base unit; and
a handset,
the base unit comprising:
a first communication unit that is configured to communicate with an external device by using a communication service subject to setting authentication data into the communication service;
an authentication data storing unit that stores the authentication data and
an authentication data transmitting unit that transmits the authentication data to the handset, and
the handset comprising:
a second communication unit that is configured to communicate with the external device by using the communication service subject to setting authentication data into the communication service;

an authentication data receiving unit that receives the authentication data transmitted from the authentication data transmitting unit; and a setting unit that sets the authentication data received by the authentication data receiving unit into the communication service when the second communication unit attempts to communicate with the external device by using the communication service, wherein the base unit further comprises a termination signal transmitting unit that transmits a termination signal to the handset;

wherein the handset further comprises a termination signal receiving unit that receives the termination signal transmitted from the termination signal transmitting unit; and wherein the second communication unit fails to communicate with the external device by using the communication service when the termination signal receiving unit receives the termination signal from the termination signal transmitting unit.

6. The communication device according to claim 5, wherein the handset further comprises a reception authentication data storing unit that stores the authentication data received by the authentication data receiving unit;

wherein the setting unit sets the authentication data stored in the reception authentication data storing unit into the communication service when the second communication unit attempts to communicate with the external device by using the communication service; and wherein the handset further comprises a deleting unit that deletes the authentication data from the reception authentication data storing unit when the termination signal receiving unit receives the termination signal from the termination signal transmitting unit.

7. A communication device according comprising:

a base unit; and a handset, the base unit comprising:

a first communication unit that is configured to communicate with an external device by using a communication service subject to setting authentication data into the communication service;

an authentication data storing unit that stores the authentication data and an authentication data transmitting unit that transmits the authentication data to the handset, and the handset comprising:

a second communication unit that is configured to communicate with the external device by using the communication service subject to setting authentication data into the communication service;

an authentication data receiving unit that receives the authentication data transmitted from the authentication data transmitting unit; and a setting unit that sets the authentication data received by the authentication data receiving unit into the communication service when the second communication unit attempts to communicate with the external device by using the communication service, wherein the authentication data storing unit stores a plurality of sets of authentication data in association with a plurality of username, each username identifying a user of the communication device, the each set of authentication data being defined with respect to a combination of the communication service and the username;

wherein the second communication unit is configured to communicate with the external device by using one communication service among a plurality of communication services, subject to setting the authentication data corresponding to the one communication service into the one communication service;

wherein the handset further comprises:

an inputting unit that enables a user of the communication device to input username; and an username transmitting unit that transmits the username to the base unit, wherein the base unit further comprises:

an username receiving unit that receives the username transmitted from the username transmitting unit; and an acquiring unit that acquires, from the authentication data storing unit, at least one set of the authentication data in association with the username received by the username receiving unit, and wherein the authentication data transmitting unit transmits at least one set of the authentication data acquired by the acquiring unit to the authentication data receiving unit when the authentication data transmitting unit receives the request from the requesting unit.

8. The communication device according to claim 7, wherein each set of the authentication data includes communication service data identifying the communication service, user ID set with respect to a combination of the username and the communication service data, and first password set for the user ID, and wherein the handset further comprises a communication service selecting unit that selects, among the at least one set of the communication service data that is included in the at least one set of the authentication data received by the authentication data receiving unit, one set of communication service data when the second communication unit attempts to communicate with the external device by using the communication service, and wherein the setting unit sets, into the communication service corresponding to the one set of communication service data selected by the communication service selecting unit, the user ID and the first password corresponding to the one set of communication service data selected by the communication service selecting unit.

9. The communication device according to claim 8, wherein the authentication data transmitting unit transmits all sets of the authentication data acquired by the acquiring unit to the authentication data receiving unit when the authentication data transmitting unit receives the request from the requesting unit;

wherein the communication service selecting unit selects, among all sets of the communication service data that are included in the all sets of the authentication data received by the authentication data receiving unit, one set of communication service data when the second communication unit attempts to communicate with the external device by using the communication service, and wherein the setting unit sets, into the communication service corresponding to the one set of communication service data selected by the communication service selecting unit, the user ID and the first password corresponding to the one set of communication service data selected by the communication service selecting unit.

10. The communication device according to claim 8, wherein the communication service selecting unit includes a manipulating unit that enables user to select one set of communication service data among the at least one set of the communication service data; and wherein the setting unit sets, into the communication service corresponding to the one set of communication service data selected by the manipulating unit, the user ID and the first password corresponding to the one set of communication service data selected by the manipulating unit.

11. A communication device comprising:
a base unit; and
a handset,
the base unit comprising:
    a first communication unit that is configured to communicate with an external device by using a communication service subject to setting authentication data into the communication service;
    an authentication data storing unit that stores the authentication data and
    an authentication data transmitting unit that transmits the authentication data to the handset, and
the handset comprising:
    a second communication unit that is configured to communicate with the external device by using the communication service subject to setting authentication data into the communication service;
    an authentication data receiving unit that receives the authentication data transmitted from the authentication data transmitting unit; and
    a setting unit that sets the authentication data received by the authentication data receiving unit into the communication service when the second communication unit attempts to communicate with the external device by using the communication service,
wherein the authentication data storing unit stores authentication data in association with username identifying a user of the communication device,
wherein the handset further comprises:
    an username inputting unit that enables the user to input username;
    a second password inputting unit that enables the user to input second password;
    an username transmitting unit that transmits the username to the base unit; and
    a second password transmitting unit that transmits the second password to the base unit;
wherein the base unit further comprises:
    a second password storing unit that stores prescribed second password for each username;
    an username receiving unit that receives the username transmitted from the username transmitting unit;
    a second password receiving unit that receives the second password transmitted from the second password transmitting unit; and
    a password determining unit that determines whether the second password matches the prescribed second password;
    an acquiring unit that acquires, from the authentication data storing unit, the authentication data corresponding to the username received by the username receiving unit when the password determining unit determines that the second password matches the prescribed second password, and
wherein the authentication data transmitting unit transmits the authentication data acquired by the acquiring unit to the authentication data receiving unit when the authentication data transmitting unit receives the request from the requesting unit.

12. A communication method executed by a communication device including a base unit and a handset, the base unit storing authentication data, the handset being configured to communicate with an external device by using a communication service subject to setting authentication data into the communication service, the communication method comprising:
    establishing a communication between the base unit and the handset by a communication unit of the base unit;
    determining whether the communication unit establishes the communication between the base unit and the handset by a determining unit of the handset;
    transmitting to an authentication data transmitting unit of the base unit, a request for transmitting the authentication data to an authentication data receiving unit of the handset by a requesting unit of the handset when the determining unit of the handset determines that the communication unit of the base unit establishes the communication between the base unit and the handset;
    transmitting the authentication data to the authentication data receiving unit of the handset by the authentication data transmitting unit of the base unit when the authentication data transmitting unit of the base unit receives the request from the requesting unit of the handset;
    receiving the authentication data transmitted from by the authentication data transmitting unit of the base unit by the authentication data receiving unit of the handset; and
    setting the authentication data into the communication service by the handset when the handset attempts to communicate with the external device by using the communication service.

13. A computer-readable recording medium that stores a communication program executed on a communication device, the communication device including a base unit and a handset, the base unit storing authentication data, the handset being configured to communicate with an external device by using the communication service subject to setting authentication data into the communication service, the communication program comprising instructions for:
    establishing a communication between the base unit and the handset by a communication unit of the base unit;
    determining whether the communication unit establishes the communication between the base unit and the handset by a determining unit of the handset;
    transmitting to an authentication data transmitting unit of the base unit, a request for transmitting the authentication data to an authentication data receiving unit of the handset by a requesting unit of the handset when the determining unit of the handset determines that the communication unit of the base unit establishes the communication between the base unit and the handset;
    transmitting the authentication data receiving unit of the authentication data to the handset by the authentication data transmitting unit of the base unit when the authentication data transmitting unit of the base unit receives the request from the requesting unit of the handset;
    receiving the authentication data transmitted from the base unit by the handset; and
    setting the authentication data into the communication service by the handset when the handset attempts to communicate with the external device by using the communication service.

* * * * *